March 3, 1959   H. A. STIFF, JR., ET AL   2,875,836
METHOD OF WATER INJECTION INTO AN EARTH BORE
Filed April 28, 1954   3 Sheets-Sheet 1

ATTEST
Lloyd A. Heneveld

INVENTORS
Henry A. Stiff, Jr.
BY Lawrence E. Davis
Herbert E. Smith
ATTORNEY

March 3, 1959  H. A. STIFF, JR., ET AL  2,875,836
METHOD OF WATER INJECTION INTO AN EARTH BORE Filed April 28, 1954  3 Sheets-Sheet 2

ATTEST

INVENTORS
Henry A. Stiff, Jr.
BY Lawrence E. Davis

ATTORNEY

March 3, 1959    H. A. STIFF, JR., ET AL    2,875,836
METHOD OF WATER INJECTION INTO AN EARTH BORE
Filed April 28, 1954      3 Sheets-Sheet 3

ATTEST

INVENTORS
Henry A. Stiff, Jr.
BY Lawrence E. Davis

ATTORNEY

United States Patent Office 2,875,836
Patented Mar. 3, 1959

2,875,836

METHOD OF WATER INJECTION INTO AN EARTH BORE

Henry A. Stiff, Jr., and Lawrence E. Davis, Dallas, Tex., assignors to The Atlantic Refining Company, Philadelphia, Pa., a corporation of Pennsylvania Application April 28, 1954, Serial No. 426,075

10 Claims. (Cl. 166—42)

This invention generally relates to a method for injecting water into the ground for purposes of flooding an oil reservoir and/or disposing of water separated from produced reservoir fluids.

In water injection processes one of the main difficulties encountered has been the corrosion of the equipment used in the water injection plant, the distribution system, and the subsurface apparatus. Heretofore many attempts have been made to combat corrosion but none of the methods used in the attempts have been completely satisfactory either because of the cost, practicability, or the efficiency of the methods. For example, it has been proposed to use a completely closed system in which the water separated from the reservoir fluid is never subjected to the atmosphere. By this method oxygen is prevented from entering into the water and thus corrosion caused by oxygen in the water is prevented. The disadvantage in the use of this closed system is that the bacteria causes the iron compounds to precipitate which clogs the walls of borehole. Furthermore, the hydrogen sulfide, carbon dioxide and other undesirable corrosive gases are still present in water, and because of the presence of oxygen in surface water it cannot be used without experiencing considerable and detrimental corrosion.

Another method contemplated by others for use in preventing corrosion is a submerged combustion process which involves burning methane in water for the purpose of liberating $H_2S$ from the water by chemical action. This process has the disadvantage that the oxygen which is responsible for much of the corrosion is not removed from the water.

Other methods used to prevent corrosion are the use of protective equipment and materials such as galvanized steel, corrosion inhibitors, paints, and scale deposits. These methods have not been at all satisfactory either because of the cost or because of their inefficiency.

Therefore an object of this invention is to provide a method of water flooding and water disposing wherein corrosion is substantially decreased.

Another object of the present invention is to provide a method which will prevent corrosion due to the undesirable corrosive gases by removing all such gases from the water.

Another object of this invention is to provide apparatus for use in water disposal and water flooding operations in which there is a substantial decrease in the corrosion of the equipment used in such operations.

Another object is to provide a water flooding process in which surface water can be used without experiencing considerable and detrimental corrosion.

Other objects and advantages will become apparent from the following description taken in connection with the accompanying drawings wherein.

Figure 1:
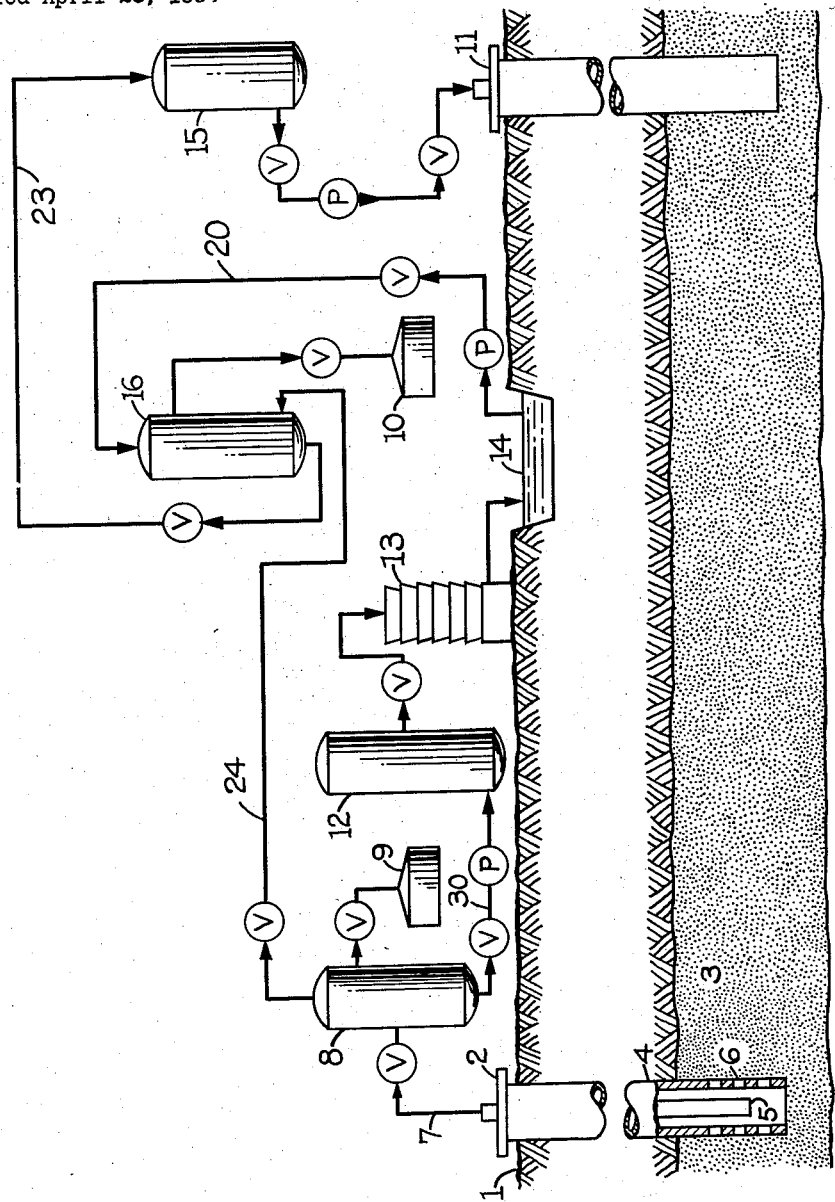
Figure 1 shows a diagrammatic view of a system for carrying out the method of the present invention.

Referring to Figure 1 of the drawing, numeral 1 denotes generally the surface of the earth. Production well 2 is shown producing from the reservoir 3. Well 2 may be of any conventional type and includes, for example, casing 4 and a tubing string 5 through which the reservoir fluid is conducted to the surface of the earth from reservoir 3 through the perforations 6 in casing 4.

After the reservoir fluid containing oil, gas, and water reaches the surface of the earth, it is conducted by means of conduit 7 to a separator unit 8 where the oil, gas, and water are separated. The separated oil is transferred into an oil tank 9. The gas is normally transferred into a gas tank 10, and the water is usually disposed into a disposal well 11 which in some cases is an injection well for a water flood operation.

In the example shown well 11 is used for the dual purpose of disposing of the water and water flooding the reservoir 3 thereby causing the reservoir fluid remaining in the reservoir 3 to be driven by the water out of the production well 2. In almost all water flooding operations more water is required than that separated from reservoir fluid produced from well 2. However, for purposes of more clearly illustrating the method and apparatus of this invention the injection of additional water will not be shown on the drawing, it being understood that this invention is not limited to any specific injection method or source and quantity of the water being injected, and that the invention applies to both the disposal of water and/or the injection of water for water flooding reservoirs.

In conventional water injection systems it has become the acceptable practice to aerate the water to remove substantially all of the hydrogen sulfide ($H_2S$) and ferrous compounds and to filter the water to remove suspended material. It has been discovered that if the water is not aerated the ferrous compounds along with the bacteria in the water form a precipitate which plugs the well and prevents the further injection of water, however, a great deal of difficulty has been encountered due to the corrosion caused by the additional oxygen added in the aeration process.

Figure 1 illustrates the system generally in use today for aerating and filtering the water. As is apparent from the drawing the water is pumped into a storage tank 12, through an aerating tower 13, and into an open earthen pit 14. In conventional systems the water is next passed through a sand filter 15 and thereafter pumped into the injection well 11. In accordance with the system of this invention, the water is transferred from pit 14 to a degasifier 16 which will be described in detail hereinafter, passed through sand filter 15, and thereafter pumped into the injection well 11.

The degasifier 16 comprises a tower through which hydrocarbon gases are passed upwardly simultaneously with water being passed downwardly. When the hydrocarbon gases contact and surround the water particles, corrosive gases which are not present in hydrocarbon gases are liberated from the water. This physical process takes place in accordance with Henry's law which states that the solubility of a gas is proportional to the partial pressure of the gas above or surrounding the liquid. Thus, when a hydrocarbon gas containing no corrosive gases such as oxygen, hydrogen sulfide, and carbon dioxide, surrounds the water particles, these corrosive gases pass out of solution with the water making the water noncorrosive.

It should be realized that the efficiency at which the gases are removed is dependent upon several factors. First, if the hydrocarbon gases used contain any one of the corrosive gases, the percentage of that one corrosive gas which will be removed from the water will be proportional to the amount of that corrosive gas present in the hydrocarbon gas. For example, hydrocarbon gases containing hydrogen sulfide ($H_2S$), referred to as sour gases, are very inefficient in removing the $H_2S$ from the water. In fact, very little, if any, $H_2S$ can be removed by a sour hydrocarbon gas.

Secondly, the efficiency of the hydrocarbon gas in removing a soluble corrosive gas from water is dependent upon whether the soluble gas forms a compound due to a reaction with the water. Carbon dioxide ($CO_2$) and ammonia ($NH_3$) gases are examples of corrosive gases which form compounds; however, the compound formed by the reaction between $CO_2$ and water is not very stable and consequently most of the $CO_2$ will be removed. On the other hand, the compound formed by the reaction of $NH_3$ and water is considerably more stable and very little $NH_3$ will be removed according to the process of this invention. Oxygen does not form a compound and therefore substantially all of the oxygen present in the water is removed by the process of this invention.

The third factor that affects the efficiency of the removal of corrosive gases is the amount of actual available contact surface between the water and the hydrocarbon gas. We have found that the maximum amount of such contact surface between the water and the hydrocarbon gas can be obtained by means of the degasifier shown in Figure 2.

Figure 2:
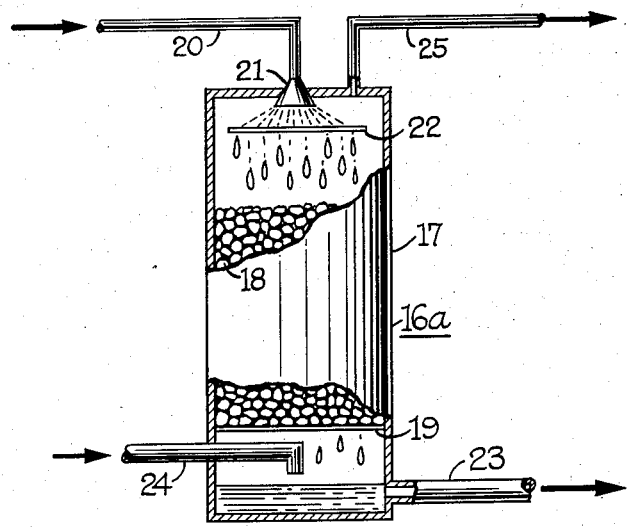
Figure 2 shows a preferred method and apparatus for removing the corrosive gases from the water to be injected.

In Figure 2 is illustrated the preferred degasifier to be used in this invention. This degasifier is generally denoted by numeral 16a and comprises what is commonly referred to as a packed absorption tower 17 which is packed with any well known packing 18 such as stone, rock, tile, or fabricated packings of many designs made of chemical stoneware, porcelain, carbon or metals. The packing is supported by a packing support plate 19 mounted inside the tower near the bottom thereof. A water inlet conduit 20 leads into the top of the tower and has at its end a nozzle 21 which sprays the water from the water source, not shown, on the baffle plate 22. The water progresses downwardly through the packing to the water outlet 23. Near the bottom of tower 17 is the hydrocarbon gas inlet 24 for transferring the hydrocarbon gas into the tower to permit the gas to pass upwardly through the packing 18 in the tower and out of the gas outlet 25. Thus a degasifier is provided whereby the corrosive gases are stripped from a water stream by means of a counterflowing hydrocarbon gas. The tower 16a of Figure 2 permits efficient removal of the corrosive gases due to the great amount of the available contact surface between the water and the hydrocarbon gas caused by the packings 18 in the tower.

It should be evident to one skilled in the art that the flow rate of water and hydrocarbon gases should be a definite value to give the maximum efficiency. It should also be evident that such rates depend on the type of packing used. For example, we have determined that with the use of a packing known as berl saddles, the maximum efficiency is obtained when $L/G = .152$; where L is the volume flow rate of liquid and G is the volume flow rate of gas.

Figure 3:
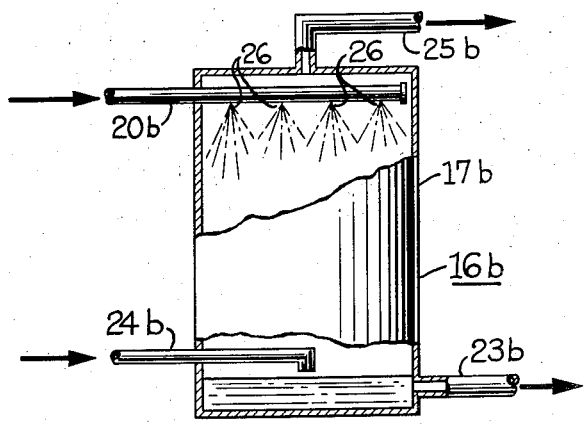
Figure 3 shows a modification of the method and apparatus of Figure 2.

Figure 3 shows another type of degasifier 16b that is contemplated for use in this invention. Degasifier 16b comprises a tower 17b having a water inlet conduit 20b, water outlet conduit 23b, gas inlet conduit 24b, and gas outlet conduit 25b, all of which function as previously set forth in the description of Figure 2. This degasifier differs from that shown in Figure 2 in that tower 17b does not have any packings. Substituted for the packings which increase the amount of water-hydrocarbon gas contact are the spray nozzles 26 which produce a fine spray of water which falls downwardly through tower 17b. As the gas progresses upwardly through the tower it contacts the fine spray stripping the corrosive gases from the water in accordance with Henry's law as previously described. It has been found that degasifier 16b is not as efficient as degasifier 16a of Figure 2, but is of cheaper construction and removes a considerable amount of the corrosive gases.

Figure 5:
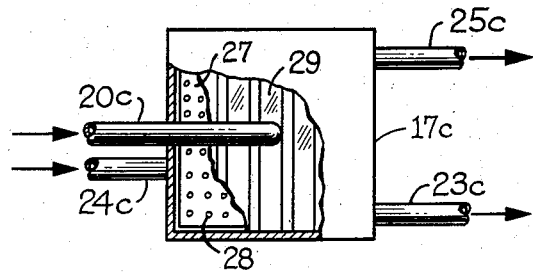
Figures 4 and 5 illustrate another modification of the method and apparatus of Figure 2.
Figure 4:
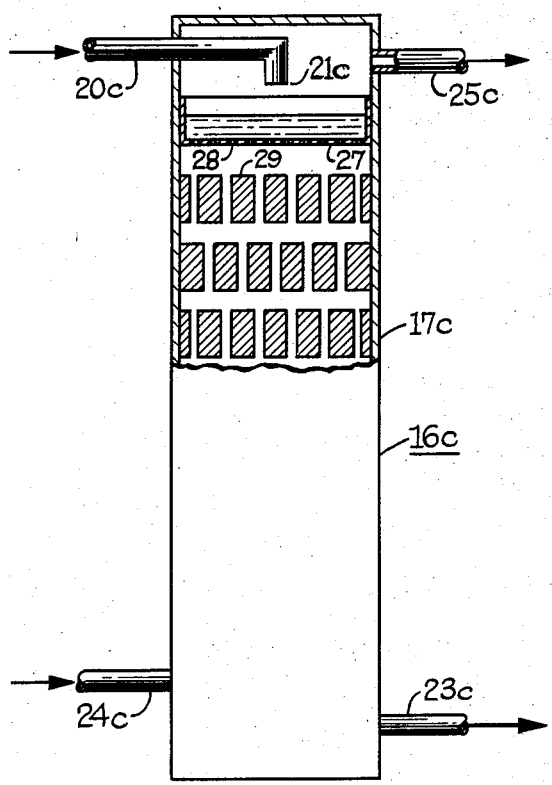

Figures 4 and 5 show still another degasifier contemplated for use in this invention. In this degasifier is provided a tower 17c having the water inlet conduit 20c, water outlet conduit 23c, gas inlet conduit 24c, and gas outlet conduit 25c. In this degasifier there is provided nozzle 21c connected to the end of the water inlet conduit 20c. Nozzle 21c injects the water against the upper face of the distribution tray 27 which has the openings 28 through which water passes to the slat trays 29. Slat trays 29 are spacedly mounted in any well known manner transversely of the longitudinal axis of tower 17c and serve the same purpose as the packings 18 of Figure 2, that is, they increase the available contact surface between the hydrocarbon gas and the water thus increasing the efficiency in the removal of corrosive gases. It has been found that the slat trays 29 of Figures 4 and 5 are not quite as efficient in aiding the removal of the corrosive gas as are the packings 18 of Figure 2 but these slats are more efficient than the spray type nozzles of Figure 3.

In referring to Figure 1, the operation of the entire system of this invention with the use of any of the degasifiers previously described is as follows:

Reservoir fluid from production well 2 is transferred through conduit 7 to the separator unit 8 where the oil, gas, and water is separated. The separated water is pumped through pipe 30 to the water storage tank 12, through aerating tower 13, and into the earthen pit 14. From the earthen pit the water is pumped to the top of the degasifier 16 through the conduit 20. The gas separated from the reservoir fluid at the separator unit 8 is transferred through gas inlet conduit 24 to the bottom of the degasifier 16. Therefore, the water injected into the degasifier unit 16 is simultaneously passed through the degasifier with the gas which is injected into the degasifier by means of conduit 24. As explained previously, the hydrocarbon gases strip the water of substantially all of the undesirable gases present therein. The water is next transferred through water outlet 23 to a filter unit 15 where suspended particles are removed. Thereafter the water is pumped into the disposal well 11 for purposes previously set forth. It should be understood that any of the degasifiers shown in Figures 2, 3, 4, and 5 can be used in accordance with this invention.

From the above description it should be evident that there has been provided a cheap and economical method of preventing the corrosion of equipment used in water-disposing or water-flooding operations because hydrocarbon gases are almost always present at the site of such operations. It should be realized that the hydrocarbon gases are not affected by the method of this invention and they can be used more than once in removing the corrosive gases from the water. However, in practice it has been found that the hydrocarbon gases present at the site of the disposal or flood operations are sufficient so that the gases need not be re-cycled.

One of the advantages of the method of this invention is that surface water can be used to water-flood reservoirs without experiencing considerable and detrimental corrosion. This has not been possible up to the present time because of the great amount of oxygen present in the surface water which accounts for a great amount of corrosion. In this method the oxygen is substantially all removed from the water which permits the economical use of surface water.

It should be understood that the apparatus disclosed to be used in this invention can be modified without departing from the scope of this invention. For instance, various degasifier towers can be used, water from various sources for water-flooding a reservoir can be used, and hydrocarbon gases from any source can be used in this invention. This invention is only limited in accordance with the following claims.

We claim:

1. The method of reducing corrosion of metallic equipment in the introduction of water which has been exposed to air for a time sufficient to become saturated with oxygen at ambient conditions of temperature and pressure into a subsurface earth formation in open communication with a borehole comprising countercurrently contacting said water with a hydrocarbon gas obtained from a second subsurface earth formation, and thereafter injecting said water into said first-mentioned subsurface earth formation through said borehole without exposure to air.

2. The method of reducing corrosion of metallic equipment in the introduction of water which has been exposed to air for a time sufficient to become saturated with oxygen at ambient conditions of temperature and pressure into a subsurface earth formation in open communication with a borehole comprising countercurrently contacting said water with a hydrocarbon gas separated from fluids produced from said subsurface earth formation through a second borehole and, thereafter, injecting said water into said subsurface earth formation through said first mentioned borehole without further exposure to air.

3. The method of reducing corrosion of metallic equipment in the water flooding of a subsurface earth formation with surface waters saturated with oxygen at ambient conditions of temperature and pressure comprising countercurrently contacting said surface waters with a hydrocarbon gas obtained from a second subsurface earth formation, and thereafter injecting said water into said first-mentioned subsurface earth formation through a borehole without exposure to air.

4. The method of reducing corrosion of metallic equipment in the introduction of surface waters saturated with oxygen at ambient conditions of temperature and pressure into a subsurface earth formation in open communication with a bore hole comprising countercurrently contacting said waters with a hydrocarbon gas obtained from a second subsurface earth formation, and thereafter injecting said water into said first-mentioned subsurface earth formation through said bore hole without exposure to air.

5. The method of reducing corrosion of metallic equipment and preventing plugging of disposal facilities in the disposal of subsurface water comprising aerating said water, countercurrently contacting said aerated water with a hydrocarbon gas obtained from a subsurface earth formation, and thereafter injecting said water into a second subsurface earth formation through a borehole without exposure to air.

6. The method of reducing corrosion of metallic equipment and preventing the plugging of disposal facilities in the disposal of water separated from fluids containing water and hydrocarbon gas and obtained from a subsurface earth formation comprising aerating said water, countercurrently contacting said aerated water with hydrocarbon gas separated from said fluids, and thereafter injecting said water into a second subsurface earth formation through a borehole without exposure to air.

7. The method of reducing corrosion of metallic equipment and preventing plugging of the flooded formation in the water flooding of a subsurface earth formation with water separated from fluids containing water and hydrocarbon gas and obtained from a second subsurface earth formation comprising aerating said water, countercurrently contacting said aerated water with hydrocarbon gas separated from said fluids, and thereafter injecting said water into said first-mentioned subsurface earth formation through a borehole without exposure to air.

8. The method of reducing corrosion of metallic equipment and preventing plugging of the flooded formation in the water flooding of a subsurface earth formation with water separated from fluids containing water and hydrocarbon gas and obtained from a first borehole located in said subsurface earth formation comprising aerating said water, countercurrently contacting said aerated water with hydrocarbon gas separated from said fluids, and thereafter injecting said water into said subsurface earth formation through a second borehole without exposure to air.

9. The method of reducing corrosion of metallic equipment and preventing plugging of the flooded formation in the waterflooding of a subsurface earth formation with water separated from fluids obtained from a second subsurface earth formation comprising aerating said water, countercurrently contacting said aerated water with hydrocarbon gas obtained from a third subsurface earth formation, and, thereafter, injecting said water into said first mentioned subsurface earth formation through a borehole without exposure to air.

10. The method of reducing corrosion of metallic equipment and preventing plugging of the flooded formation in the waterflooding of a subsurface earth formation with water separated from fluids obtained from said subsurface earth formation comprising aerating said water, countercurrently contacting said aerated water with hydrocarbon gas obtained from a second subsurface earth formation and, thereafter, injecting said water into said first mentioned subsurface earth formation through a borehole without exposure to air.

References Cited in the file of this patent

UNITED STATES PATENTS

| | | |
|---|---|---|
| 2,398,123 | Sowers | Apr. 9, 1946 |
| 2,457,959 | Walker | Jan. 4, 1949 |
| 2,488,563 | Sills | Nov. 22, 1949 |
| 2,591,497 | Berl | Apr. 1, 1952 |

FOREIGN PATENTS

| | | |
|---|---|---|
| 161,574 | Great Britain | Apr. 11, 1921 |